United States Patent [19]

Oltendorf

[11] 4,337,428

[45] Jun. 29, 1982

[54] DECELERATION INITIATION CIRCUIT FOR A STEPPER MOTOR

[75] Inventor: Norman E. Oltendorf, Algonquin, Ill.

[73] Assignee: Bodine Electric Company, Chicago, Ill.

[21] Appl. No.: 185,021

[22] Filed: Sep. 8, 1980

[51] Int. Cl.³ .............................................. G05B 19/40
[52] U.S. Cl. ...................................... 318/696; 318/685
[58] Field of Search ................ 318/685, 696, 138, 254

[56] References Cited

U.S. PATENT DOCUMENTS

| 3,476,996 | 11/1969 | Fredriksen | 318/696 |
| 3,617,715 | 11/1971 | Dummermuth | 318/696 UX |
| 3,818,261 | 6/1974 | Clarke, Jr. | 318/696 |
| 4,223,260 | 9/1980 | Beer et al. | 318/696 |

OTHER PUBLICATIONS

Sigma Stepping Motor Handbook, pp. 1-61.

Primary Examiner—B. Dobeck
Attorney, Agent, or Firm—Allegretti, Newitt, Witcoff & McAndrews

[57] ABSTRACT

A deceleration initiation circuit for a stepper is described, wherein a monitor signal representing each drive pulse received by the stator and a deceleration signal representing a predetermined drive pulse are compared. A deceleration initiating signal is issued whenever a predetermined relationship exists between the signals.

10 Claims, 3 Drawing Figures

DECELERATION INITIATION CIRCUIT FOR A STEPPER MOTOR

BACKGROUND AND SUMMARY OF THE INVENTION

The present invention relates generally to stepper motors and more particularly to a circuit for initiating deceleration of a stepper motor.

It is well known in the art of stepper motors that there are basically two modes of operation. The first mode is low speed operation, often designated "error free start stop" or "EFSS". In this mode, the stepper motor can be accurately started or stopped at any predetermined position, i.e., started or stopped error free.

The second mode is high speed operation, generally designated "slewing". In slewing, the stepper motor is initially operated in the EFSS mode, ramped or accelerated to slew speed, operated at slew speed for a predetermined time and then decelerated to EFSS speed in order to permit accurate positioning.

In a principal aspect, the present invention is an improved circuit for selectively initiating the deceleration of a stepper motor after operation in the slew mode. The deceleration initiation circuit includes a monitor system, an input system, and a comparator system. The input system provides a selectable deceleration signal representing a predetermined time and a corresponding drive pulse (within the series of drive pulses received by the stator of the stepper motor) when deceleration is to begin.

The monitor system is coupled to the stepper motor and monitors or counts drive pulses. The monitor system responsively provides a monitor signal representative of each drive pulse received by the stator.

The comparator system receives and compares the selectable deceleration signal and the monitor signal generated by the input system and monitor system, respectively. Whenever a predetermined relationship exists, the comparator system provides a deceleration initiating signal, and in response thereto, deceleration of the stepper motor commences.

It is thus an object of the present invention to provide an improved circuit for initiating deceleration of a stepper motor. Another object is an improved, simplified deceleration initiating circuit.

Still another object of the present invention is an improved deceleration initiation circuit for a stepper motor wherein the deceleration initiation point is selectable. It is also an object to provide a circuit for selectively controlling the initiation of deceleration in a stepper motor whereby the average time for deceleration over a series of long and short traverses is substantially minimized. Yet another object is a reliable deceleration circuit for a stepper motor capable of providing stable, accurate and repeatable deceleration.

These and other objects, features and advantages of the present invention are described or apparent in the following description of a preferred embodiment.

BRIEF DESCRIPTION OF THE DRAWING

Preferred embodiments of the present invention are described herein, in detail, with reference to the drawing wherein.

DESCRIPTION OF A PREFERRED EMBODIMENT

Figure 1:
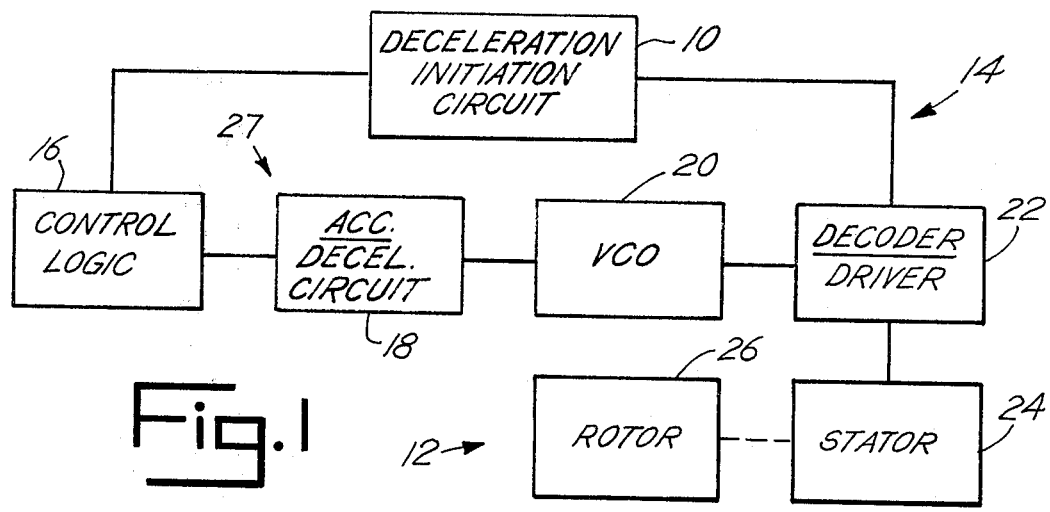
FIG. 1 is a schematic block diagram of a stepper motor including a preferred embodiment of the present invention.
Figure 2:
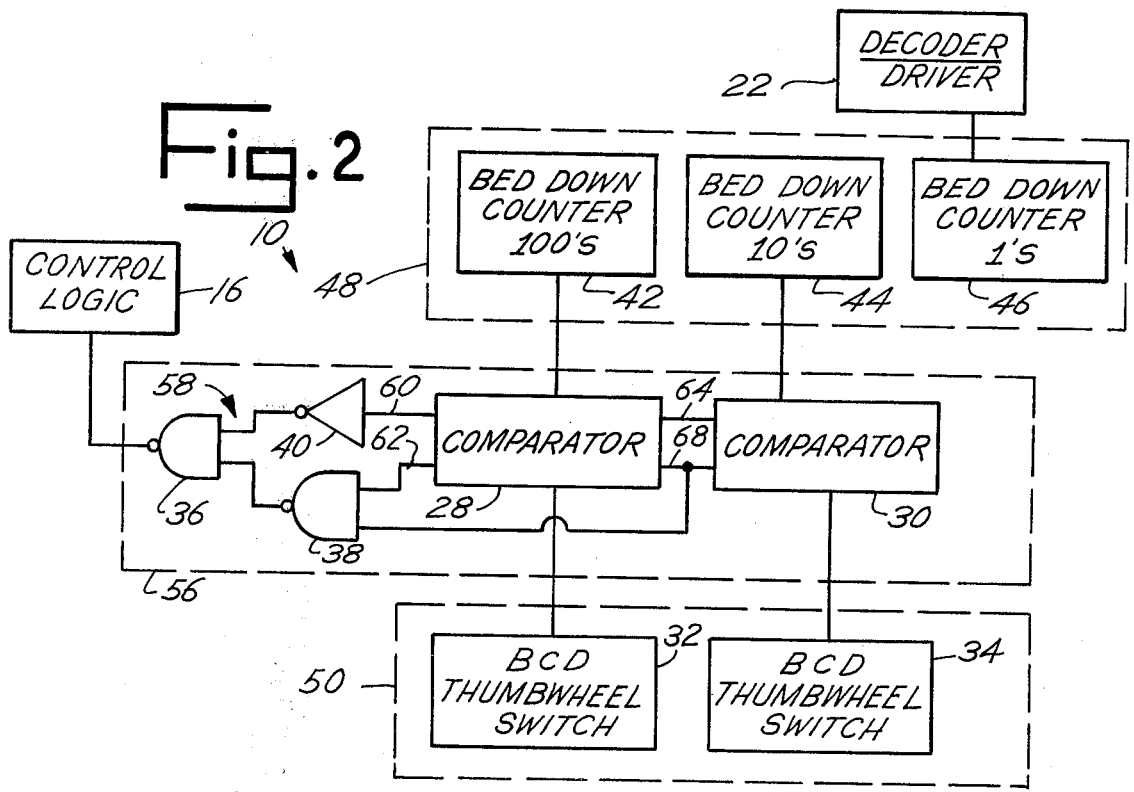
FIG. 2 is a schematic diagram of the preferred embodiment shown in FIG. 1.

Referring to FIGS. 1 and 2, a preferred embodiment of the present invention is shown as an improved deceleration initiation circuit 10 for a stepper motor 12. As shown, the stepper motor 12 has associated therewith control electronics, generally designated 14, and including a control logic 16, an acceleration/deceleration circuit 18, a voltage controlled oscillator 20 and a decoder/driver 22. The stepper motor 12 includes a stator 24 and a rotor 26, and the stepper motor 12 and electronics 14 are interconnected as shown in an open loop.

The rotor 26 is electromagnetically coupled to the stator 24. The stator 24 is energized by the decoder/driver 22 in response to the voltage controlled oscillator 20. The frequency of the oscillator 20 and thus the operational speed of the stepper motor 12 are controlled by the logic control 16 and the acceleration/deceleration circuit 18. Responsive to the logic control 16, the acceleration/deceleration circuit 18 provides an appropriate output voltage received by the voltage controlled oscillator 20.

In the low speed or EFSS mode, the output voltage of the deceleration/acceleration circuit 18 is a low constant voltage and the frequency of the voltage controlled oscillator 20 is proportional thereto. To accelerate and operate in the slew speed mode, the output voltage of the deceleration/acceleration circuit 18 is increased or "ramped" to a high constant voltage. Deceleration requires "ramping down" to the EFSS or low speed voltage. As such, the control electronics 14 define drive means, generally designated 27, for providing a variably timed series of drive pulses to the stator 24 of the stepper motor 12.

It should also be understood that the point of deceleration initiation may be reached prior to the attainment of slew speed. That is, deceleration and the corresponding "ramping down" of the voltage received by the voltage controlled oscillator 20 may begin before the output voltage of the deceleration/acceleration circuit 18 reaches its maximum.

As shown, the deceleration circuit 10 is coupled to the decoder/driver 22 and monitors the drive pulses transmitted thereby to the stator 24 during operation of the stepper motor 12. At a selectable time, corresponding to a selectable drive pulse, the deceleration circuit 10 provides a deceleration initiating signal to the control logic 16 and the control logic 16 responsively begins deceleration.

In each application of the stepper motor 12, sufficient time must be allowed for deceleration to provide accurate, repeatable operation. That is, a sufficient period for deceleration and EFSS operation is necessary to ensure that the stepper motor 12 stops in the desired position.

Referring now primarily to FIG. 2, the deceleration circuit 10 includes, in this preferred embodiment, a first comparator 28, a second comparator 30, a first BCD thumbwheel switch 32, a second BCD thumbwheel switch 34, a first NAND gate 36, a second NAND gate 38, an inverter 40, a first BCD down counter 42, a second BCD down counter 44 and a third BCD down counter 46, interconnected as shown. The third BCD down counter 46 is interconnected to the decoder/driver 22 and the first NAND gate 36 is coupled to the control logic 16.

In this preferred embodiment, the first, second and third BCD down counters 42, 44, 46 are interconnected or latched and define, in cooperation, monitor means 48 for monitoring or counting drive pulses. With each drive pulse transmitted by the decoder/driver 22 to the stator 24, the monitor means 48 counts down.

Initially, the monitor means 48 is electronically set by the logic control 16 to the final, desired stop position of the rotor 26, which also represents the number of drive pulses to be received by the stator 24 of the stepper motor 12. This position is represented, in this preferred embodiment, by a three-digit number, i.e., hundreds, tens and ones (for example, 954), and the first, second and third BCD down counters 42, 44, 46 are initially and respectively set in accordance therewith.

It is to be understood that the monitor means 48 including the BCD down counters 42, 44, 46 are merely illustrative. Greater range is provided with the addition of down counters.

The monitor means 48 responsively provides a monitor signal representing each of the drive pulses received by the stator 24. In this preferred embodiment, the monitor signal includes a first and second monitor component provided by the first and second BCD down counters 42, 44, respectively. Thus, each drive pulse is represented by the monitor signal as a hundreds component and a tens component.

The switches 32, 34 cooperatively define input means 50 for providing a selectable deceleration signal. In this preferred embodiment, the selection is made by the operator of the stepper motor 12 by appropriate setting of the switches 32, 34.

The deceleration signal represents the selected time when deceleration is to be initiated. This selected time corresponds to a predetermined rotor position and thus a predetermined drive pulse within the series of drive pulses received by the stator 24.

Figure 3:
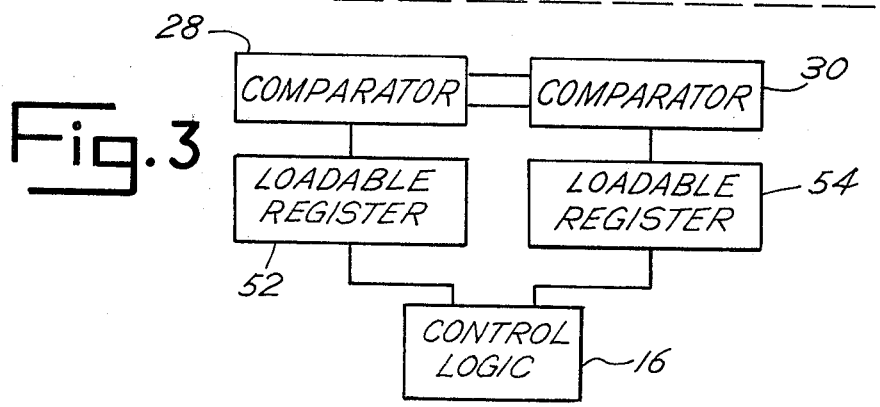
FIG. 3 is a partial schematic diagram of an alternative embodiment of the present invention.

In an alternative embodiment of the present invention, shown in FIG. 3, the input means 50 includes a pair of loadable registers 52, 54, replacing the switches 32, 34, respectively. The registers 52, 54 are coupled to the control logic 16 and appropriately set thereby prior to initiation of a drive sequence. The control logic 16 is programmed to set the registers 52, 54 in accordance with an alogrithm relating the time for deceleration to the desired stop position or, more particularly, to the number of steps in the drive sequence.

The input means 50 represents the deceleration initiating drive pulse by a two-digit number. The digits are hundreds and tens, respectively. The switch 32, or register 52, provides the hundreds digit component, and thereby corresponds in significance to the counter 42 of the monitor means 48. The switch 34, or register 54, provides the tens digit component of the deceleration signal and corresponds in significance to the counter 44.

The comparators 28, 30, NAND gates 36, 38 and inverter 40, in combination, define comparator means 56, coupled to the monitor means 48 and the input means 50. The comparator means 56 receives the monitor signal and the deceleration signal therefrom and compares the respective components. In response, and whenever a predetermined relationship exists between the monitor signal and the deceleration signal, the comparator means 56 provides a deceleration initiating signal received by the logic control 16. Upon receipt, the logic control 16 initiates deceleration.

More particularly, the comparators 28, 30 receive and compare the respective components of the monitor signal and the deceleration signal. The output of the comparators 28, 30 is a comparison signal representing the relationship between the respective components.

The NAND gates 36, 38 and the inverter 40 also cooperatively define logic means, generally designated 58, for receiving the comparison signal from the comparator means 56 and responsively generating the deceleration initiating signal, received by the logic control 16. The logic means 58 provides the deceleration initiating signal whenever the hundreds components, compared by the comparator 28, are equal and whenever the tens components, compared by the comparator 30, switch from an equal relationship to an unequal relationship. As a result, if input switches 32, 34 are set at "8" and "6", respectively, the deceleration initiating signal will occur substantially simultaneously with drive pulse "860".

The comparators 28, 30 have output terminals 60, 62, and 64, 66 respectively. Whenever the monitor component from the counter 42 is greater than the deceleration component from the switch 32, the comparator 28 provides a "0" at the terminal 60 and a "0" at the terminal 62. When the components are equal, the output at the terminal 62 becomes a "1". When the monitor component is less than the deceleration component, the outputs at the terminals 60, 62 are a "1" and "0" respectively.

Whenever the monitor component from the counter 44 is greater than the deceleration component from the switch 34, the comparator 30 provides a "0" at the output terminal 64 and a "0" at the output terminal 66. Reversing the relationship produces a "0" and a "1" at the output terminals 64, 66, respectively, and equality of the components produces a "1" at the output terminal 64 and a "0" at the output terminal 66.

The output signal of the NAND gate 36, in response to the comparator signal, is a "0" until the hundreds components are equal and until the tens component of the selectable deceleration signal exceeds the corresponding component of the monitor signal. In this preferred embodiment, the logic control 16 recognizes a "0" to "1" transistion from the logic means 58 as the deceleration initiating signal.

The logic means 58 eliminates a third comparator and a third thumbwheel input switch or loadable register for the units digit. This results in a substantial per unit cost savings without any accuracy loss.

The selectability of the deceleration initiation point is a particularly significant feature of the present invention. With this selectability, the deceleration time for each application of the stepper motor 12 and indeed for each drive sequence can be substantially minimized. More particularly, the minimum deceleration period can be selected, based upon the length of the drive pulse sequence and thus the speed of the stepper motor 12 obtained during the sequence.

Preferred embodiments of the present invention have been described herein. It is to be understood that various changes and modifications can be made without departing from the true scope and spirit of the present invention, as defined by the following claims. These claims are to be interpreted in light of the foregoing specification.

What is claimed is:

1. In a stepper motor of the type including a stator and having associated therewith drive means for providing a variably timed series of drive pulses to said stator, said stepper motor being operable at a low speed and an accelerated speed in response to said variably timed series of drive pulses, an improved circuit for selectably initiating deceleration of said stepper motor after operation thereof at said accelerated speed, comprising, in combination:

monitor means, coupled to said drive means, for monitoring said drive pulses during operation of said stepper motor and providing a monitor signal representing each of said drive pulses, respectively;

input means for providing a selectable deceleration signal representing a predetermined drive pulse within said variably timed series, said predetermined drive pulse corresponding to a predetermined time during operation of said stepper motor when deceleration thereof is to be initiated; and comparator means, coupled to said monitor means and said input means, for receiving and comparing said monitor signal and said selectable deceleration signal and for responsively providing a deceleration initiating signal to said drive means whenever a predetermined relationship exists between said monitor signal and said selectable deceleration signal, said drive means initiating deceleration of said stepper motor in response to said deceleration initiating signal.

2. An improved circuit as claimed in claim 1 wherein said selectable deceleration signal includes a first and second deceleration component.

3. An improved circuit as claimed in claim 2 wherein said input means includes a first and second switch respectively providing said first and second deceleration components.

4. An improved circuit as claimed in claim 2 wherein said input means includes a first and second loadable register respectively providing said first and second deceleration components.

5. An improved circuit as claimed in claim 2 wherein said comparator means includes a first and second comparator interconnected to receive said first and a second deceleration components, respectively.

6. An improved circuit as claimed in claims 1 or 5 wherein said monitor signal includes a first and second monitor component.

7. An improved circuit as claimed in claim 6 wherein said monitor means includes a first counter, a second counter and a third counter, interconnected to monitor said drive pulses, said first and second counters providing said first and second monitor components of said monitor signal, respectively.

8. An improved circuit as claimed in claim 7 wherein said first counter is interconnected to said first comparator and said second counter is interconnected to said second comparator.

9. An improved circuit as claimed in claim 5 or 8 wherein said first and second comparators cooperatively provide a comparison signal in response to said monitor means and said input means.

10. An improved circuit as claimed in claim 9 wherein said comparator means includes logic means, coupled to said first and second comparators, for receiving said comparison signal and generating said deceleration initiating signal in response thereto.

* * * * *